INVENTOR
TADEUSZ BUDZICH
BY
McNENNY, FARRINGTON, PEARNE & GORDON
ATTORNEYS

United States Patent Office 3,470,694
Patented Oct. 7, 1969

3,470,694
FLOW PROPORTIONAL VALVE FOR
LOAD RESPONSIVE SYSTEM
Tadeusz Budzich, Moreland Hills, Ohio, assignor to The
Weatherhead Company, Cleveland, Ohio, a corporation of Ohio
Filed Apr. 30, 1968, Ser. No. 725,380
Int. Cl. F15b 15/18; F01b 21/00
U.S. Cl. 60—52                                   15 Claims

ABSTRACT OF THE DISCLOSURE

A flow proportional valve for use in a closed center load responsive fluid power system. The valve is located between the outlet of the system's variable displacement pump and each of a plurality of expansible chamber motors operated by the pump. The output of the pump is regulated by a load responsive control which maintains the outlet pressure of the pump a fixed differential above the highest motor chamber pressure in the system. Each of the flow proportional valves is provided with a pressure regulating valve directed across its valve spool throttling area to maintain the pressure drop across the valve spool throttling area constant, independent of the pump supply pressure and independent of its motor chamber pressure.

---

This invention relates generally to fluid power systems and more particularly to closed-center systems having a variable displacement pump supplying a plurality of load motors individually controlled by separate control valves in which the pump is provided with a load responsive displacement control arranged to maintain the pump outlet pressure a predetermined differential above the fluid pressure in a load motor.

Closed-center load responsive systems are highly desirable due to the minimal power loss and low heat build up resulting from the outlet pressure of the variable displacement pump not exceeding the system requirements. Furthermore, the metering characteristics of such a system are very efficient when the system is used to supply fluid to a plurality of load motors all of which are operating at substantially the same pressure since the pump outlet pressure is always maintained at a selected pressure differential above the load demand pressure of the load motors so that the pressure drop across each load motor control valve is maintained substantially constant.

Such closed-center load responsive systems have in the past, however, been limited in their use to applications in which the load demand pressures of all of the load motors in the system are substantially the same since in any closed-center load responsive system using more than one load motor it is necessary to regulate the pump outlet pressure to maintain its selected differential above the highest of the load demand pressures. If the load demand pressures are not substantially the same in all of the other loads being operated at the same time, the pump supply pressure will exceed the other load demand pressures by more than the selected differential so that the pressure drop across each of the other control valves increases and the desired metering of flow to each of the other load motors is lost. This is particularly true when the higher pressure varies substantially in value so that a varying pressure differential is caused to appear across the control valves controlling the other loads operating at lower pressures.

It is therefore an object of this invention to provide a novel and improved control valve for a load responsive system which regulates fluid flow to a load proportional only to its input signal and independent of its load demand pressure or the pump outlet pressure.

It is another object of this invention to provide a novel and improved control valve as set forth in the preceding object which combines in a single unit a flow proportional valve and a feedback signal means which transmits its load demand pressure to the pump outlet control only when it is the highest load demand pressure in the system.

It is a further object of this invention to provide a novel and improved load responsive fluid power system for metering fluid flow from a single source to a plurality of loads independent of the demand pressure of each load and the source outlet pressure.

It is still a further object of this invention to provide a novel and improved load responsive fluid power system as set forth in the preceding object wherein the outlet pressure of the source is maintained a substantially fixed differential above the highest demand pressure in the plurality of loads.

Briefly, the foregoing and other and additional objects and advantages of this invention are accomplished by providing a novel flow proportional valve constructed according to the present invention between the outlet of a variable displacement pump and each of a plurality of load motors to be operated by the outlet fluid from the pump. The variable displacement pump is provided with a differential pressure compensator control which maintains the outlet pressure of the pump a substantially fixed differential above a feedback pressure from a load motor. Each of the flow proportional valves is provided with a feedback signal passage which transmits its load demand pressure to the differential pressure compensator control only when that load demand pressure is the highest in the plurality of loads, so that the outlet pressure of the pump is always maintained at a pressure above the highest load demand pressure in the system. Each flow proportional valve is further provided with a pressure regulating valve operating between the fluid inlet chamber and a supply chamber to maintain a sufficient pressure drop therebetween to maintain the pressure drop across the valve spool throttling area to the load between the supply chamber and the outlet chamber substantially constant. Since the pressured drop across the throttling area to the load is maintained substantially constant, the flow therethrough will be substantially constant for any setting of the valve spool independent of the load demand pressure and independent of the supply pump outlet pressure.

The foregoing as well as additional objects and features of the invention are accomplished in the preferred embodiment of the invention as shown in the accompanying drawings and described in the following detailed description.

Figure 1:
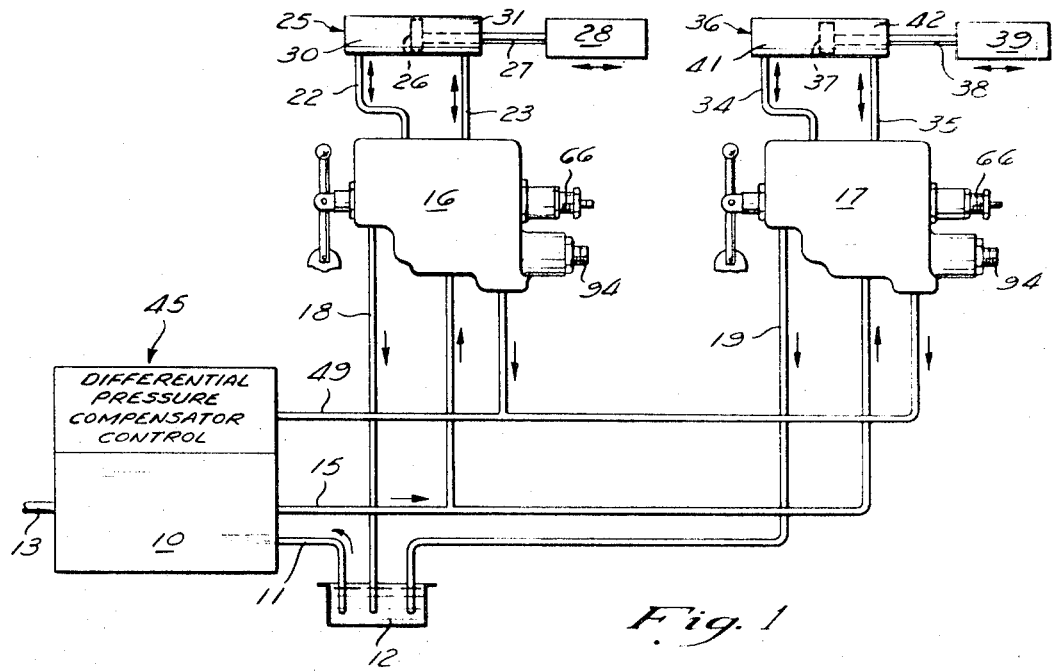
FIGURE 1 is a schematic circuit diagram of a load responsive fluid power system according to this invention.

Referring now to the figures in greater detail, the circuit shown in FIGURE 1 includes a variable displacement pump 10, which may be of any type such as an axial piston or radial piston pump in which there is a control member for varying the output displacement of the pump. As shown, the pump has an inlet line 11 which supplies fluid to the pump from a reservoir 12, and the pump is driven by suitable means from a prime mover such as by the drive shaft 13.

The pump has an outlet line 15 which is connected to the selector control valves 16 and 17. Drain lines 18 and 19 return fluid from the valves 16 and 17 respectively to the reservoir 12. Valve 16 is connected through a pair of control lines 22 and 23 to opposite ends of a load cylinder 25. As shown, the cylinder 25 is a double acting expansible chamber fluid motor having a piston 26 therein which is connected by piston rod 27 to the load 28 to be driven by the motor. Thus, the piston 26 separates the interior of cylinder 25 into left and right fluid motor chambers 30 and 31 which are connected to the control lines 22 and 23 respectively. In a similar manner, valve 17 is connected through a pair of control lines 34 and 35 to opposite ends of load cylinder 36 which is a double acting expansible chamber fluid motor having a piston 37 therein connected by piston rod 38 to the load 39 to be driven by the motor. The piston 37 separtes the interior of cylinder 36 into left and right fluid motor chambers 41 and 42 which are connected to the control lines 34 and 35 respectively.

The output displacement of pump 10 is varied by a load responsive differential pressure compensator control 45 which operates to maintain the outlet pressure of pump 10 at a substantially fixed pressure differential above the maximum load demand pressure in the system as transmitted to the control 45 through the feedback line 49 from valves 16 and 17. The operation of the differential pressure compensator control 45 is explained in greater detail below with reference to FIGURE 3.

Figure 2:
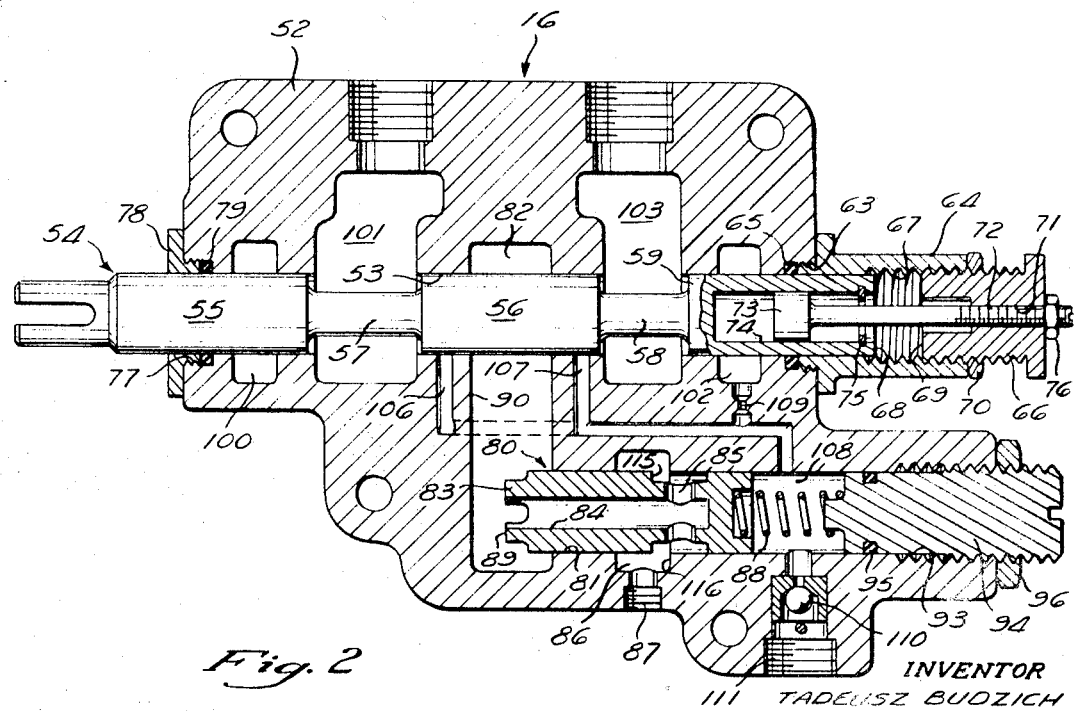
FIGURE 2 is a side elevation in cross section of a preferred embodiment of the flow proportional valve used in FIGURE 1.

FIGURE 2 shows the structural details of the flow proportional valve 16, which is identical in structure to the valve 17. The flow proportional valve 16 is provided with a housing 52 having an axially extending bore 53 therethrough. A valve spool 54 is slidably mounted within bore 53 and is provided with a left valving land 55, a central valving land 56 defined by left and right annular grooves 57 and 58 respectively, and a right valving land 59. At the right end of axial bore 53 is a threaded counterbore 63 within which is received a tubular sleeve member 64 which holds O-ring seal 65 in place to prevent fluid leakage. A cylindrical plug member 66 is received by the internally threaded right end portion 67 of sleeve member 64 and may be axially positioned therein by rotational movement of the plug member. Axial displacement of valve spool 54 to the right is then adjustably limited by interengagement of its right end wall 68 with radial end wall 69 of plug member 66. When the desired right most position of valve spool 54 has been determined, the plug member 66 may be locked in position by lock nut 70. The plug member 66 is provided with a partially threaded axially extending bore 71 within which is received a generally cylindrical plunger 72. The plunger 72 is provided with an enlarged left end portion 73 operable to slide within axial end bore 74 extending from the left end wall 68 of valve spool 54 and limit the axial displacement of valve spool 54 to the left by interengagement with retaining ring 75. Once the desired left most position of valve spool 54 has been determined, the plunger 73 may be locked in place by lock nut 76. At the left end of axial bore 53 is a threaded counterbore 77 within which is received a plug member 78 which holds O-ring seal 79 in place to prevent fluid leakage.

The valve housing 52 is also provided with a pressure regulating valve 80 within an axial bore 81 which extends from the right side of housing 52 inwardly to a supply chamber 82. A cylindrical plunger 83 is slidably mounted within bore 81 and is provided with an axial bore 84 communicating with supply chamber 82 at its left end and extending to a lateral opening 85 communicating with a pump pressure inlet chamber 86 which is supplied with high pressure fluid from the pump outlet line 15 through an inlet port 87. The plunger 83 is spring biased to the left by coil spring 88 and is limited in movement to the left by contact between its left end wall 89 and the side wall 90 of supply chamber 82. At the right end of axial bore 81 is a threaded end portion 93 within which is received a plug member 94 making sealing contact with the walls of bore 81 by means of O-ring seal 95. The biasing force of coil spring 88 on plunger 83 can then be increased or decreased by axial displacement of plug member 94 within bore 81. A lock nut 96 is provided to lock plug member 94 in place once the proper biasing force of coil spring 88 on plunger 83 has been determined.

With the valve spool 54 in the neutral position as shown in FIGURE 2, the left valving land 55 isolates a left reservoir return chamber 100 from a left outlet chamber 101, while the right valving land 59 isolates a right reservoir return chamber 102 from a right outlet chamber 103. The outlet chambers 101 and 103 are connected to the load cylinder 25 by control lines 22 and 23 respectively while the return chambers 100 and 102 are connected to the reservoir 12 by drain line 18. The central valving land 56 isolates the chambers 82, 101 and 103 from one another and from feedback passages 106 and 107, both of which are in fluid communication with a feedback chamber portion 108 of bore 81 which has a feedback port 111 connected to feedback line 49. An orifice passage 109 interconnects feedback chamber 108 and reservoir return chamber 102 in order to provide a small but controlled continuous bleed to reservoir of the fluid pressure within the feedback chamber 108 for purposes of stability. A ball type check valve 110 is provided between the feedback chamber 108 and the feedback line 49 so that a pressure signal from chamber 108 can be transmitted through line 49 to the differential pressure compensator control 45 if the pressure in chamber 108 is greater than the feedback pressure in line 49 from the feedback chamber of valve 17. However, if the pressure transmitted to the differential pressure compensator control 45 through feedback line 49 from valve 17 exceeds the pressure in chamber 108, the check valve 110 will prevent that pressure from entering chamber 108. This is important for the operation of the flow proportional valve 16 due to the function of the feedback pressure signal in chamber 108 as explained below.

When valve spool 54 is moved from its neutral position to the right, fluid communication is first established between the left outlet chamber 101 and the feedback passage 106 by annular groove 57, allowing the load demand pressure from motor chamber 30 to be transmitted through the passage 106 to the feedback chamber 108. If this load demand pressure of load cylinder 25 is greater than the feedback pressure in line 49 from valve 17, the check valve 110 will permit this pressure signal in chamber 108 to be transmitted through line 49 to the differential pressure compensator control 45. In response to this increase in feedback pressure, the compensator control 45 will operate to increase the outlet pressure of the variable displacement pump 10 to a predetermined substantially fixed pressure level differential above the load demand pressure of motor chamber 30 as explained below. This increased pressure is then transmitted to the valve 17 and to the inlet chamber 86 of valve 16 through the pump outlet line 15. As the valve spool 54 is axially displaced further to the right, fluid communication between the right outlet chamber 103 and the right reservoir return chamber 102 is established by annular groove 58, allowing fluid from the motor chamber 31 to return to the reservoir 12 when the piston 26 is displaced to the right. With the valve spool 54 in its right most position as determined by engagement of its end wall 68 with the end wall 69 of plug member 66, fluid communication is also established by annular groove 57 between the supply chamber 82 and the left outlet chamber 101, thereby allowing the fluid to flow from the supply chamber 82 through the valve spool throttling area created between the valving land 56 and the side wall 90 of supply chamber 82 and into the supply chamber 101 supplying fluid to the fluid motor chamber 30 through control line 22.

The plunger 83 of the pressure regulating valve 80 is biased to the left by the load demand pressure in feedback chamber 108 acting on its cross-sectional area and by the coil spring 88, and it is biased to the right by the supply pressure within the supply chamber 82 acting on its cross-sectional area. As the plunger 83 moves to the right within axial bore 80, the size of the pressure regulating valve throttling area created between the radial wall 115 of lateral opening 85 and the side wall 116 of the inlet pressure chamber 86 decreases resulting in a greater pressure drop across that throttling area. Similarly, as the plunger 83 moves to the left, the pressure drop across the pressure regulating valve throttling area decreases. Since the plunger 83 will reach a stabilized position only when the fluid pressure in the supply chamber 82 is quivalent to the fluid pressure in the outlet chamber 101 plus the effective force of the spring 88, the magnitude of the effective force applied to plunger 83 by the coil spring 88 determines the pressure differential across the valve spool throttling area between supply chamber 82 and outlet chamber 101. In order to maintain this pressure differential substantially fixed regardless of the rate of flow, the spring 88 is selected to have a preload that is high relative to its spring rate so that the force applied to the plunger 83 is substantially constant regardless of the axial position of plunger 83. Since the pressure drop across the valve spool throttling area is dependent only upon the effective pressure applied by spring 88 on plunger 83, and since this effective pressure is substantially constant, the pressure drop across the valve spool throttling area will be substantially constant for any valve spool setting independent of the pump outlet pressure and independent of the load demand pressure.

In operation, if the load demand pressure of load cylinder 25 is greater than that of load cylinder 36 so that the output of pump 10 is controlled by the feedback signal from valve 16, then a subsequent increase in the load demand pressure of load cylinder 36 to a level substantially above this feedback signal will be transmitted to the differential pressure compensator control 45, and in a manner described below the differential pressure compensator control will operate to increase the output pressure of the variable displacement pump 10 to a substantially fixed pressure level differential above the load demand pressure of cylinder 36. Without the structure of this invention, an increase such as this in the pump outlet pressure level substantially above the load demand pressure required by load cylinder 25 would result in an increase in the rate of fluid flow to cylinder 25 and the piston 26 would move faster than the rate previously selected. With the present invention, this effect is obviated and the desired metering of fluid flow to the load cylinder 25 is maintained by the operation of the pressure regulating valve 80 across the valve spool throttling area to maintain a constant pressure differential across this throttling area independently of the pump supply pressure. As the fluid pressure is increased in the pump outlet line 15 and the flow proportional valve inlet chamber 86, the pressure in the supply chamber 82 will begin to increase, moving the plunger 83 to the right and increasing the pressure drop across the pressure regulating valve throttling area to maintain the pressure in the supply chamber 82 at a level equivalent to the load demand pressure in the outlet chamber 101 plus the effective pressure of the spring 88. Therefore, even with a substantial increase in the pump supply pressure, the pressure drop across the valve spool throttling area will remain substantially constant and the metering of the flow to the load cylinder 25 will remain unchanged.

It is important to the constant metering characteristics of the flow proportional valve 16 that the pressure level differential maintained by the differential pressure compensator control 45 between the load demand pressure from cylinder 25 and the pump pressure in the inlet chamber 86 be equal to or greater than the pressure drop across the valve spool throttling area determined by spring 88. If this requirement is met, the pressure regulating valve 80 will operate in the manner described above to maintain a constant pressure drop across the valve spool throttling area in order that the flow to the load cylinder 25 be dependent only upon the position of the valve spool 54. However, if this requirement is not met, the constant metering characteristics of the valve 16 will be lost since the pressure regulating valve 80 will not be able to maintain the constant pressure drop across the valve spool throttling area and that pressure drop will decrease resulting in a decreased flow to the load cylinder 25 for the selected setting of the valve spool 54.

Figure 3:
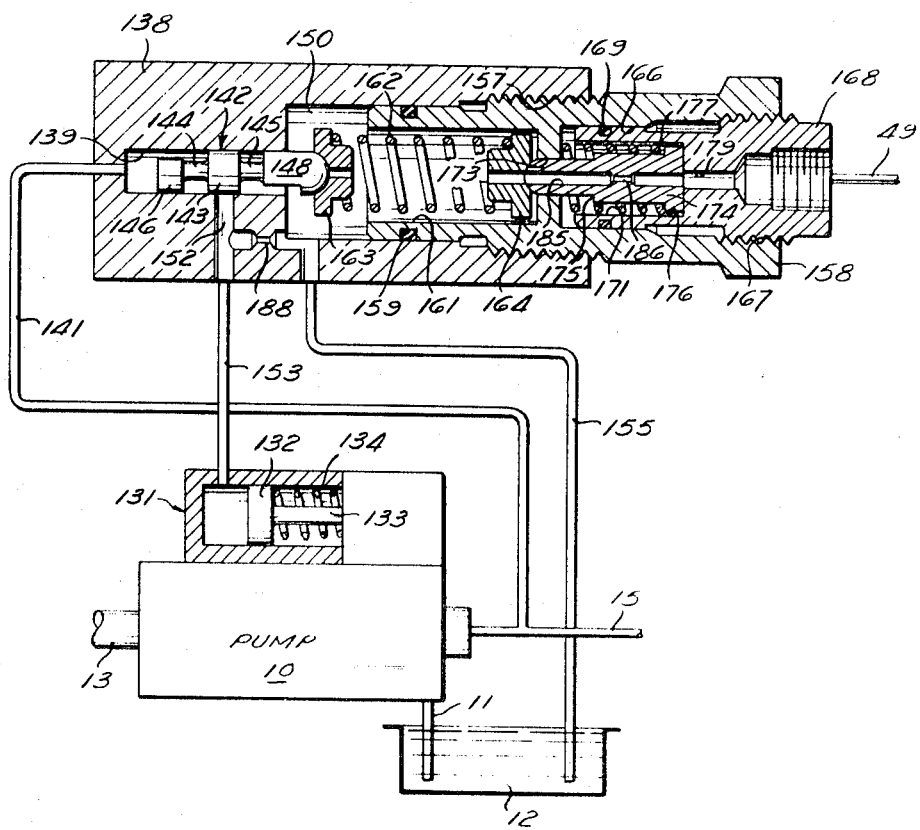
FIGURE 3 is a schematic circuit diagram of a load responsive differential pressure compensator control of the pump of FIGURE 1.

FIGURE 3 shows the structural details of the differential pressure compensator control 45, which is more fully explained in my copending United States patent application, Ser. No. 613,533, filed Feb. 2, 1967. As shown in FIGURE 3, the displacement of the pump 10 is varied by a control cylinder 131 which may be incorporated into the pump housing and within which is mounted a piston 132 connected by piston rod 133 to a pump member (not shown) which is used to vary the displacement of the pump. A spring 134 is shown as acting on piston 132 to bias piston 132 and rod 133 to the maximum displacement position. Thus, the introduction of fluid pressure into the cylinder 131 will force the piston 132 to the right against the biasing force of spring 134 to reduce the pump output displacement.

The control valve for controlling the admission of fluid pressure into the control cylinder 131 includes a housing 138 having a valve bore 139 therein at one end. The one end of bore 139 is connected through line 141 directly to the pump outlet line 15 so that this end of bore 139 is always exposed to full pump outlet pressure. A valve spool 142 is slidably mounted within bore 139 and has a central valving land 143 adjacent its midpoint and defined by left and right annular grooves 144 and 145 respectively. The left groove 144 is always exposed to full pump outlet pressure through the line 141 and communicated past flats on the left guide land 146 outward of the groove 144. Likewise, the right groove 145 is connected by flats on the right guide land 148 with the fluid pressure within an enlarged chamber 150 into which the right guide land 148 projects. When the spool 142 is in the neutral position as shown in FIGURE 3, the valving land 143 blocks a passage 152 which is connected through line 153 to the control cylinder 131. Thus, fluid pressure can act on the effective area of spool 142 shifting it to a right hand position with the left groove 144 in alignment with passage 152 to admit fluid at full outlet pressure into the passage 152 and line 153 to the control cylinder to reduce the pump output displacement. On the other hand the valve spool 142 can be shifted to the left against the pump outlet pressure so that the passage 152 is in communication with the right groove 145 to allow the fluid within the control cylinder 131 to flow back through passage 152 into groove 145 and hence past the guide land 148 into the chamber 150, which is connected by a line 155 to the reservoir 12 so that chamber 150 is always at reservoir pressure.

At its outer end the chamber 150 has an enlarged threaded counterbore 157 within which is mounted an end housing 158 making sealing engagement with the walls of chamber 150 by means of an O-ring seal 159. The end housing 158 has a bore 161 extending therein from the left end and freely communicating with the chamber 150. A control spring 162 is located within this bore 161 and at its left end engages a spring abutment 163 which also engages the end of the right guide land 148 of spool 142 so that the spring 162 is able to apply a biasing force to the spool 142 tending to move it to the left as shown in FIGURE 3. At its right hand end, the control spring 162 engages a right abutment plug 164, the axial movement of which within the bore 161 varies the biasing force applied by the control spring 162 on the valve spool 142.

At the right hand end of end housing 158 is a bore 166 having a threaded counterbore 167 at its outer end, within which is received a plug member 168 making sealing contact with the walls of bore 166 by means of O-ring seal 169. The plug 168 at its left end has a bore 171 in free communication with the right end housing bore 166. The end housing 158 has a reduced diameter bore 173 extending between the left and right bores 161 and 166 respectively. Bore 173 is slightly larger in diameter than valve bore 139 and slidably carries a plunger 174. The plunger at its one end engages the right control spring abutment plug 164 and at its right end extends into the plug bore 171 where it has an enlarged head 176. A balancing spring 177 is located around the plunger 174 and abuts at its left end against the inner end of end housing bore 166 and its right end against the plunger head 176 so it provides a biasing force tending to shift the plunger 174 to the right as shown in FIGURE 3. A shoulder 175 of plunger 174 limits its movement toward the left as it engages the end wall of bore 166 around bore 173. The plug member 168 has a passage 179 therein extending from the bore 171 and connected by a feedback line 49 to the flow proportional valves 16 and 17 which communicate with the load cylinders 25 and 36 respectively. As explained above, the one-way check valve 110 in flow proportional valve 16 and an identical check valve in flow proportional valve 17 are operable to admit the higher of the load demand pressures required by either load cylinder 25 or load cylinder 36 to the feedback line 49.

The plunger 174 has an axial passage 185 therethrough provided with a reduced diameter orifice 186 so that fluid in the feedback line 49 communicated into the bore 171 will be able to bleed at a slow but controlled rate into the chamber 150 for return to the reservoir to allow the pressure in the line 49 to drop when the pressure drops in the controlling load cylinder 25 or 36 so that the feedback line 49 can return to this pressure and not remain in a condition where both of the check valves within the flow proportional valves 16 and 17 would be closed to prevent communication of feedback pressure from the load motors. In addition, the housing 138 is provided with an orifice passage 188 interconnecting the passage 152 and the chamber 150 to provide a small but controlled continuous bleed to reservoir of the fluid pressure within the control cylinder 131 for purposes of stability.

When there is no demand on the pump, that is, no pressure in the feedback line 49, the pressure in the plug bore 171 containing the plunger 174 will be at reservoir pressure because of the bleed through the plunger passage 185 to the chamber 150. Therefore, the plunger 174 will assume the position shown in FIGURE 3 against the end of the bore 171 so that the right spring abutment plug 164 shifts to the position applying the least compression to the control spring 162. In this position the control spring 162 applies only a relatively light biasing force to the spool 142 so that as pressure begins to build up in the pump outlet line 15, this pressure is transmitted to the line 141 to the left hand end of the spool 142 and shifts it a sufficient distance toward the right as to bring the left groove 144 into communication with the passage 152 so that the pump outlet fluid is transmitted to the control cylinder 131 to reduce the pump to the minimum displacement. Because of the existence of the orifice passage 188, there will always be a slight make up flow into the passage 152 which allows the spool to stabilize without oscillation to maintain a steady position of the piston 132 in control cylinder 131.

Thus, under no load conditions, the maximum pressure in the pump outlet line 15 is limited to a low level of, for example, 200 p.s.i. However, when a load is encountered in either of the load cylinders 25 or 36, the resulting pressure in these chambers is transmitted through the appropriate one of the flow proportional valves 16 or 17 into the feedback line 49 where it is transmitted into the bore 171. Thus, the bore 171 is pressurized to bias the plunger 174 toward the left as seen in FIGURE 3 with a force corresponding to the motor chamber pressure required by the load. This results in an increasing force being applied to the control spring 162 moving the right abutment plug 164 to the left to thereby increase the biasing force on the spool 142. This increased biasing force requires an increased balancing force transmitted to the line 141, and accordingly the control cylinder piston is shifted to increase the pump output displacement by the amount necessary to return the valve spool 142 to an equilibrium position. Thus, the greater the feedback pressure in line 49, the greater the pressure level in line 141 and hence at the pump outlet to maintain an equilibrium condition in the control cylinder 131.

The balancing spring 177 biasing the plunger 174 toward the right performs a compensating function to maintain the pump outlet pressure in line 15 a fixed difference above the pressure in feedback line 49 regardless of the magnitude of the pump outlet pressure. As explained above, it is desirable that this fixed pressure difference be at least as great as the fixed pressure drop across the valve spool throttling area of the flow proportional valves 16 and 17 in order to maintain the desired metering of fluid flow to load cylinders 25 and 36.

It will be seen that the entire assembly consisting of the valve spool 142, control spring 162 and plunger 174 may be considered as a unit, since they may slide in the control valve housing in such fashion. Since the pressure in line 141 corresponds to the high pressure side of the valves 16 and 17 and outlet line 15, and the pressure acting on plunger 174 through the feedback line 49 corresponds to the low pressure across the controling valve 16 or 17, there is a pressure unbalance across this unit exactly corresponding to the pressure drop across the controling flow proportional valve. However, since plunger 174 has a larger diameter than valve spool 142, the forces are in balance if the ratio between the pressure in lines 141 and 49 is the same as the ratio between the areas of bores 173 and 139.

For this reason, a given pressure differential will correspond with a given differential area only at a given absolute pressure level, so that in the absence of any other forces an increase in the pump outlet pressure will result in an increasing pressure differential between lines 141 and 49 as determined by the ratio of the areas between the bores 173 and 139. To compensate for this, the balancing spring 177 provides a compensating force acting on the plunger 174. Since movement of the plunger 174 toward the left is controlled by the spring 162, and since increased movement of the plunger 174 toward the left corresponds with an increase in the pressure in feedback line 49 which corresponds to an increase in pump outlet pressure, the plunger 174 will tend to move toward the left in a linear fashion with increasing pump outlet pressure. The balancing spring 177 acts between the end housing 158 and the plunger 174 so as to provide an increasing biasing force on the plunger 174 opposing movement toward the left. The balancing spring 177 may therefore be chosen to have a spring rate corresponding to the area differential between the bores 139 and 173 so that it provides an increasing biasing force with increasing movement of the plunger 174 toward the left with increasing pressure. The effect of the area differential between the bores is decreased so that the ratio between the pressures in lines 141 and 49 decreases in such a manner that the pressure difference is constant. Thus, the compensation provides a fixed pressure differential between lines 141 and 49 which is independent of pump outlet pressure below the maximum outlet pressure for which the pump is regulated.

The valve assembly within the housing 138 also functions as a pressure compensated control valve for the pump. As the pressure in the feedback line 49 increases toward a predetermined maximum, the plunger 174 is moved to the left until the shoulder 175 abuts against the end wall of bore 166 surrounding the bore 173 so that further movement of the plunger 174 to the left is prevented. Since increasing feedback pressure in line 49 can no longer increase the biasing force of the spring 162, any increase in the pump outlet pressure in line 141 after engagement of the shoulder 175 has prevented further movement of plunger 174 will result in continued movement of the valve spool 142 to the right to decrease the pump output volume to prevent further increases in outlet pressure above this predetermined limit. Thus, the valve operates to regulate the pump outlet pressure and volume in accordance with the demand only until the load reaches a predetermined maximum, after which no further increase in pump outlet pressure above the maximum is possible.

Assuming that the pump has been regulated to a given high pressure determined by the load, a decrease in the load will result in a decrease in the pressure in the controlling one of the load cylinders 25 and 36, so that the check valve in the corresponding one of the valves 16 and 17 will close to isolate the feedback line 49 from the load. Since there is a bleed through the plunger passage 185 and orifice 186 into the chamber 150 which is connected to drain, the fluid within the bore 171 will bleed out through the passage allowing the plunger 174 to move to the right to decrease the bias in control spring 162. This allows the pressure in line 141 to shift the valve spool 142 to the right to allow high pressure to enter the control cylinder 131 through line 153 and moves the piston 132 to the right to decrease the pump output volume and thereby cause a drop in the pump outlet line until the pressure balance between the pump outlet and the load is such that the check valve in the corresponding one of the valves 16 and 17 will open to allow a return to equilibrium conditions.

While several embodiments of this invention have been shown and described in detail, it is recognized that upon understanding this invention various further modifications and rearrangements will readily suggest themselves to those skilled in the art and may be resorted to without departing from the scope of the invention.

What is claimed is:

1. A valve assembly comprising a housing having a fluid inlet chamber, a fluid supply chamber, and a fluid outlet chamber, a first valve means interconnecting said supply chamber with said outlet chamber and operable to meter fluid flow therebetween, and a second valve means interconnecting said inlet chamber with said supply chamber, said second valve means being operable to reduce the fluid pressure from said inlet chamber to maintain the fluid pressure in said supply chamber a predetermined pressure differential above the fluid pressure in said outlet chamber.

2. A valve assembly as set forth in claim 1 wherein said second valve means is operable responsive to the fluid pressure within said outlet chamber.

3. A valve assembly as set forth in claim 1 wherein said second valve means includes a plunger slidably disposed within a bore interconnecting said inlet chamber with said supply chamber.

4. A valve assembly as set forth in claim 3 wherein said plunger is biased in one direction by fluid pressure from said supply chamber, and said plunger is biased in the other direction by fluid pressure from said outlet chamber and by a spring biasing means.

5. A valve assembly as set forth in claim 4 wherein an orifice means provides a small continuous bleed of said fluid biasing said plunger in said other direction.

6. A valve assembly as set forth in claim 4 wherein said plunger is provided with an axially extending passage opened at one end to said supply chamber and terminating at a lateral opening in said plunger opened to said inlet chamber, said lateral opening cooperating with said housing surrounding said bore to define a throttling area to regulate said pressure drop between said inlet chamber and said supply chamber in relation to the position of said plunger within said bore.

7. A valve assembly as set forth in claim 1 wherein said first valve means includes a valve spool slidably mounted within a bore, said valve spool being operable to isolate said outlet chamber from said supply chamber when in a neutral position.

8. A valve assembly as set forth in claim 7 wherein said housing includes a feedback signal chamber, said valve spool being operable when displaced from said neutral position to establish fluid communication first between said outlet chamber and said feedback signal chamber, and then between said output chamber and said supply chamber.

9. A four-way fluid control valve assembly comprising a housing having a first bore, a series of chambers arranged in spaced adjacency along said first bore, said series including a first fluid return chamber, a first fluid outlet chamber, a fluid supply chamber, a second fluid outlet chamber, and a second fluid return chamber, a valve spool slidably disposed in said first bore and operable to isolate each of said chambers in said series when in a neutral position, a fluid inlet chamber in spaced adjacency to said fluid supply chamber, a second bore establishing fluid communication between said inlet chamber and said supply chamber, a valve means in said second bore operable to reduce the fluid pressure from said inlet chamber to maintain the fluid pressure differential between said supply chamber and one of said outlet chambers substantially fixed; said valve means including a plunger slidably disposed in said second bore, an axially extending passage in said plunger open at one end to said supply chamber and terminating at a lateral opening in said plunger open to said inlet chamber, said lateral opening cooperating with said housing surrounding said second bore to define a throttling area operable to reduce the fluid pressure from said inlet chamber relative to the position of said plunger in said second bore, a plug member threadably disposed in said second bore and operable to move toward or away from said plunger, a feedback chamber in said second bore defined by the end walls of said plunger and said plug member, a helical spring acting between said plug member and said plunger to bias said plunger to a position of minimum pressure reduction; a feedback passage establishing fluid communication between said feedback chamber and said first bore, said valve spool in said first bore being operable to isolate said feedback passage from said series of chambers when in said neutral position, and said valve spool being operable to establish fluid communication first between one of said outlet chambers and said feedback passage and then between said one outlet chamber and said supply chamber when displaced from said neutral position, orifice means between said feedback chamber and one of said return chambers to provide a small but continuous bleed of fluid from said feedback chamber, and a check valve interconnecting said feedback chamber with a feedback port, said check valve being operable to transmit the fluid pressure from said feedback chamber to said feedback port only when the fluid pressure in said feedback chamber exceeds the fluid pressure in said feedback port.

10. A load responsive control system comprising a variable output pump having an outlet and a control, a reservoir, a plurality of load motors, a control valve for each load motor operable to selectively connect said load motor to said outlet and to said reservoir, at least one of said valves including a housing having a fluid outlet chamber in communication with the load motor, a first valve means interconnecting a supply chamber with said outlet chamber and operable to meter fluid flow therebetween, and a second valve means interconnecting said inlet chamber with said supply chamber, said second valve means being operable to reduce the fluid pressure from said inlet chamber to maintain the fluid pressure in said supply chamber a substantially fixed pressure differential above the fluid pressure in said outlet chamber, said pressure differential being independent of the load demand pressure of said load motor, and a feedback line establishing fluid communication between said load motor and said pump control, said control being constructed and arranged to maintain the outlet pressure of said pump a substantially fixed differential above the fluid pressure in said feedback line.

11. A load responsive control system as set forth in claim 10 wherein said housing is provided with an outlet chamber feedback passage, said feedback passage having a check valve therein, said check valve being operable to transmit the load demand pressure from said outlet chamber to said feedback line when said load demand pressure is the highest in said plurality of load motors, and to prevent said feedback line pressure from entering said feedback passage when said feedback line pressure is greater than said feedback passage pressure.

12. A load responsive control system as set forth in claim 11 wherein said second valve means includes a plunger slidably disposed within a bore and operable to regulate the pressure drop between said inlet chamber and said supply chamber relative to its position within said bore, said plunger being biased in a first direction by fluid pressure from said supply chamber to increase said pressure drop, and said plunger being biased in a second direction by fluid pressure from said outlet chamber and by a spring means to decrease said pressure drop.

13. A load responsive control system as set forth in claim 12 wherein said plunger is provided with an axially extending passage open to said supply chamber and terminating at a lateral opening in said plunger open to said inlet chamber, said lateral opening cooperating with said housing surrounding said bore to define a throttling area to regulate said pressure drop across said second valve means relative to the position of said plunger within said bore.

14. A load responsive control system as set forth in claim 12 wherein said first valve means includes a valve bore, a valve spool slidably disposed within said valve bore and operable to isolate said outlet chamber, said supply chamber, and said feedback passage from one another when said valve spool is in a neutral position.

15. A load responsive control system as set forth in claim 14 wherein said valve spool is operable to establish fluid communication first between said outlet chamber and said feedback signal passage and then between said outlet chamber and said supply chamber when said valve spool is displaced from said neutral position.

References Cited
UNITED STATES PATENTS

| | | | |
|---|---|---|---|
| 1,905,132 | 4/1933 | Bishop et al. | 60—52 XR |
| 2,313,056 | 3/1943 | Emerson et al. | |
| 2,737,196 | 3/1956 | Eames | 91—412 XR |
| 3,163,006 | 12/1965 | Nuss et al. | 91—468 XR |
| 3,411,416 | 11/1968 | Herd et al. | 60—52 XR |

EDGAR W. GEOGHEGAN, Primary Examiner

U.S. Cl. X.R.

60—97; 91—412, 444, 448; 137—613